US008974334B2

(12) United States Patent
Stephenson

(10) Patent No.: US 8,974,334 B2
(45) Date of Patent: Mar. 10, 2015

(54) CABLE DRIVE AND TENSION ASSEMBLY

(71) Applicant: D B Industries, LLC, Red Wing, MN (US)

(72) Inventor: Matthew S. Stephenson, Red Wing, MN (US)

(73) Assignee: D B Industries, LLC, Red Wing, MN (US)

( * ) Notice: Subject to any disclaimer, the term of this patent is extended or adjusted under 35 U.S.C. 154(b) by 152 days.

(21) Appl. No.: 13/645,142

(22) Filed: Oct. 4, 2012

(65) Prior Publication Data

US 2013/0095968 A1 Apr. 18, 2013

Related U.S. Application Data

(60) Provisional application No. 61/547,284, filed on Oct. 14, 2011.

(51) Int. Cl.
*F16H 7/12* (2006.01)
*F16H 7/00* (2006.01)
(Continued)

(52) U.S. Cl.
CPC ................ *E06C 7/12* (2013.01); *B66D 1/7405* (2013.01); *B66D 1/7489* (2013.01)
USPC ............. 474/138; 474/115; 474/66; 254/392; 182/8; 182/107; 182/129

(58) Field of Classification Search
USPC .............. 474/115, 138, 144, 64–68; 254/392, 254/408; 182/8, 107, 129; 160/321; 24/129 A; 74/89.22
See application file for complete search history.

(56) References Cited

U.S. PATENT DOCUMENTS

| | | | | |
|---|---|---|---|---|
| 55,344 A | * | 6/1866 | Nell | 403/104 |
| 108,761 A | * | 11/1870 | Clover | 474/138 |

(Continued)

FOREIGN PATENT DOCUMENTS

| | | |
|---|---|---|
| CN | 201667581 | 12/2010 |
| DE | 682552 | 10/1939 |

(Continued)

OTHER PUBLICATIONS

Avanti Climb Assistance—A Safe Investment. Avanti Wind Systems, Products and Services [online] [retrieved on Apr. 26, 2010] retrieved from <http://www.avanti-online.com/_binary?id=12610> 2 pages.

(Continued)

*Primary Examiner* — William E Dondero
*Assistant Examiner* — Minh Truong
(74) *Attorney, Agent, or Firm* — IPLM Group, P.A.

(57) ABSTRACT

A tensioning assembly having a drive pulley, a tension pulley and a tension adjustment system is provided. The drive pulley has a first drive pulley channel and a second drive pulley channel. The tension pulley has a first tension pulley channel and a second tension pulley channel. The second tension pulley channel is aligned with the first drive pulley channel. The first drive pulley channel and the second drive pulley channel of the drive pulley and the first tension pulley channel and a second tension pulley channel of the tension pulley are configured and arranged to engage and route an endless looped member. The tension adjustment system is coupled to adjust the distance between the drive pulley and the tension pulley to adjust the tension in the endless looped member in relation to the drive pulley.

15 Claims, 7 Drawing Sheets

(51) Int. Cl.

| | |
|---|---|
| ***B66D 3/04*** | (2006.01) |
| ***A47L 3/04*** | (2006.01) |
| ***E06C 5/32*** | (2006.01) |
| ***E06C 7/12*** | (2006.01) |
| ***B66D 1/74*** | (2006.01) |

(56) References Cited

U.S. PATENT DOCUMENTS

| | | | | | |
|---|---|---|---|---|---|
| 1,672,959 | A * | 6/1928 | Spillman | 474/138 |
| 2,546,202 | A | 3/1951 | Trouin | |
| 3,151,857 | A * | 10/1964 | Falkenberg | 267/71 |
| 3,436,979 | A * | 4/1969 | Molitor | 474/138 |
| 3,477,670 | A * | 11/1969 | Sloyan | 248/653 |
| 3,826,335 | A * | 7/1974 | Allen | 182/10 |
| 3,910,130 | A * | 10/1975 | Traughber, Jr. | 74/89.22 |
| 3,944,185 | A | 3/1976 | Evans | |
| 4,252,214 | A * | 2/1981 | Miller | 182/8 |
| 4,258,832 | A | 3/1981 | Thorp | |
| 4,538,703 | A | 9/1985 | Ellis et al. | |
| 4,550,804 | A | 11/1985 | Bummer | |
| 4,611,688 | A | 9/1986 | Sekhar | |
| 4,997,064 | A | 3/1991 | Motte et al. | |
| 5,030,173 | A * | 7/1991 | Bryant | 474/136 |
| 5,186,289 | A | 2/1993 | Wolner et al. | |
| 5,829,203 | A | 11/1998 | Ealer, Sr. | |
| 6,792,999 | B2 * | 9/2004 | Cross et al. | 160/321 |
| 7,798,288 | B2 | 9/2010 | Blasek | |
| 7,987,945 | B2 | 8/2011 | Petersen | |
| 8,272,134 | B2 * | 9/2012 | Soika et al. | 30/390 |
| 8,867,963 | B2 * | 10/2014 | Tsuji et al. | 399/167 |
| 2002/0086752 | A1 * | 7/2002 | Friedrich et al. | 474/148 |
| 2004/0020719 | A1 | 2/2004 | Kwak | |
| 2004/0087400 | A1 * | 5/2004 | Youn | 474/117 |
| 2004/0209720 | A1 * | 10/2004 | Chapman et al. | 474/113 |
| 2007/0062759 | A1 | 3/2007 | Jones et al. | |
| 2007/0158137 | A1 | 7/2007 | Petersen | |
| 2007/0215410 | A1 | 9/2007 | Ecker | |
| 2008/0142298 | A1 | 6/2008 | Blasek | |
| 2009/0249712 | A1 | 10/2009 | Brickell et al. | |
| 2009/0288913 | A1 | 11/2009 | Nielsen | |
| 2010/0219015 | A1 | 9/2010 | Meillet | |
| 2010/0219016 | A1 | 9/2010 | Meillet | |
| 2010/0326768 | A1 | 12/2010 | Kerstetter, Jr. | |

FOREIGN PATENT DOCUMENTS

| | | | |
|---|---|---|---|
| DE | 38 17 435 | A1 | 11/1989 |
| DE | 202006019928 | U1 | 9/2007 |
| DE | 20 2007 012 803 | U1 | 3/2009 |
| EP | 1 319 796 | A1 | 6/2003 |
| GB | 363093 | | 12/1931 |
| WO | WO 92/11065 | | 7/1992 |
| WO | WO 03/071083 | A1 | 8/2003 |
| WO | WO 2005/088063 | A1 | 9/2005 |
| WO | WO 2005095750 | | 10/2005 |

OTHER PUBLICATIONS

Avanti Climb Assistance—Type VI, User's Manual and Installation Instructions. Avanti Stigefabrik A/S. 2nd Edition, Dec. 2006, 27 pages.

Avanti Climb Assistance—Type VI, User's Manual and Installation Instructions. Avanti Stigefabrik A/S. 3nd Edition, Nov. 2007, 48 pages.

DBI Sala, User Instruction Manual LAD-SAF® Detachable Cable Sleeve. DB Industries, Inc. Form 5902112, Rev: E, 2003, 4 pages.

DBI Sala, User Instruction Manual 3511063 (SSB63) Climb Assist/Fall Arrest System. DB Industries, Inc. Form 5902147, Rev: D, 2004, 20 pages.

Non-Final Office Action for U.S. Appl. No. 12/694,079 mailed Aug. 15, 2012, 15 pages.

International Partial Search Report for the Application Serial No. PCT/US2010/024905, mailed Jun. 28, 2010, 6 pages.

Suncor 316 SS Quick Attach Eye Swage Fitting, Suncor Stainless, Inc. [online] [retrieved Apr. 26, 2010]. Retrieved from Jamestown Distributors webpage at <http://www.jamestowndistributors.com/userportal/show_product.do?pid=52127&familyName=Suncor+316+SS+Quick+Attach+Eye+Swage+Fitting> 2 pages.

tractelift® Climbing Aid for vertical ladders, Tractel Inc. Griphoist Divison. G729_tractelift_Pro/GB.pm6, Date unknown, 4 pages.

Written Opinion—Search Report of the Intellectual Property Office of Singapore for Singapore Application No. 201106007-6 mailed Oct. 31, 2012.

International Search Report of PCT/US2012/059488 mailed Jan. 23, 2013, 4 pages.

Non-Final Office Action of U.S. Appl. No. 12/694,079, mailed Nov. 6, 2014.

* cited by examiner

FIG.4A
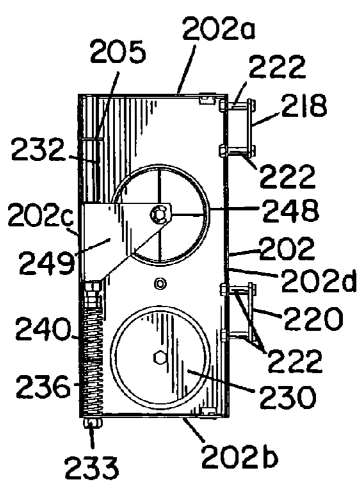
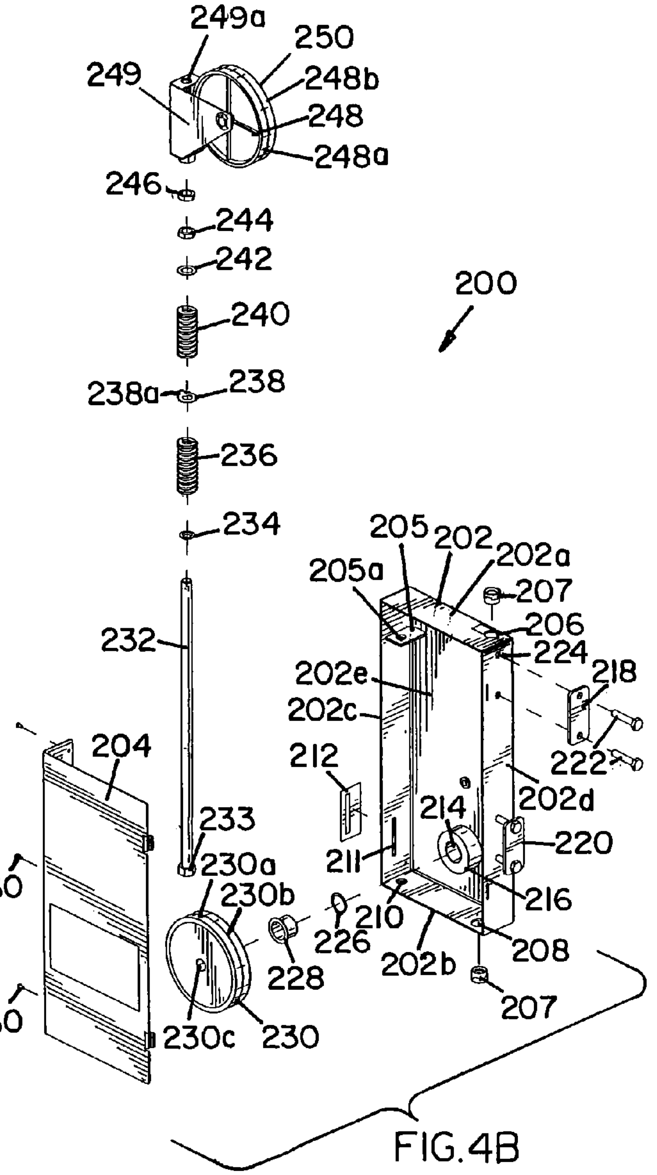
FIG.4B

CABLE DRIVE AND TENSION ASSEMBLY

CROSS-REFERENCE TO RELATED APPLICATIONS

This Application claims priority to U.S. Provisional Application Ser. No. 61/547,284, same title herewith, filed on Oct. 14, 2011, which is incorporated in its entirety herein by reference.

BACKGROUND

The ability to service devices that are elevated requires a system for getting a service technician to the device. One common system used to reach elevated locations is a ladder. However, when the distance to reach the device is significant, the use of a ladder is restricted to only those individuals that are physically capable of climbing the distance of the ladder. Safety issues also have to be considered. The more fatigue a worker is experiencing, the more likely an accident could occur, such as slipping and falling. Hence, fatigue that comes with climbing great distances should be taken into consideration when implementing a system to reach a device at an elevated location. A climb assist system can be used to aid the worker in climbing the ladder. A typical climb assist system would employ a motor driven looped cable that is attached to a safety harness donned by the worker.

For the reasons stated above and for other reasons stated below which will become apparent to those skilled in the art upon reading and understanding the present specification, there is a need in the art for an efficient and effective method of tensioning an endless looped member in a climb assist system to ensure the proper operation of the climb assist system.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a tensioning assembly is provided. The tensioning assembly includes a drive pulley, a tension pulley and a tension adjustment system. The drive pulley has a first drive pulley channel and a second drive pulley channel. The tension pulley has a first tension pulley channel and a second tension pulley channel. The second tension pulley channel is aligned with the first drive pulley channel. The first drive pulley channel and the second drive pulley channel of the drive pulley and the first tension pulley channel and a second tension pulley channel of the tension pulley are configured and arranged to engage and route an endless looped member. The tension adjustment system is coupled to adjust the distance between the drive pulley and the tension pulley to adjust the tension in the endless looped member in relation to the drive pulley.

In another embodiment, a drive and tensioning assembly is provided. The assembly includes a housing, a drive pulley, a drive assembly, a tension pulley and a tension adjustment system. The drive pulley is received in the housing and has a first drive pulley channel and a second drive pulley channel. The drive assembly includes a drive shaft. The drive assembly is configured to rotate the drive shaft. The drive shaft extends through a housing aperture. Moreover, the drive pulley is in rotational communication with the drive shaft of the drive assembly. The tension pulley is also received in the housing and has a first tension pulley channel and a second tension pulley channel. The second tension pulley channel being aligned with the first drive pulley channel. The first drive pulley channel and the second drive pulley channel of the drive pulley and the first tension pulley channel and a second tension pulley channel of the tension pulley configured and arranged to engage and route an endless looped member into and out of the housing. The tension adjustment system is coupled to adjust the distance between the drive pulley and the tension pulley in the housing.

In still another embodiment, a climb assist system is provided. The climb assist system includes an upper pulley assembly, a lower pulley assembly, a tension assembly and a drive assembly. The upper pulley assembly is configured and arranged to be coupled to an upper rung of a ladder. The upper pulley assembly is further configured to route an endless looped member about different sides of the ladder. The lower pulley assembly is configured and arranged to be coupled to an lower rung of a ladder. The lower pulley assembly is further configured to route the endless looped member about different sides of the ladder to the upper pulley assembly. The tension assembly includes a drive pulley, a tension pulley and a tension adjustment system. The drive pulley has a first drive pulley channel and a second drive pulley channel. The tension pulley has a first tension pulley channel and a second tension pulley channel. The second tension pulley channel is aligned with the first drive pulley channel. The first drive pulley channel and the second drive pulley channel of the drive pulley and the first tension pulley channel and a second tension pulley channel of the tension pulley are configured and arranged to engage and route the endless looped member. The tension adjustment system is coupled to adjust the distance between the drive pulley and the tension pulley. The drive assembly has a drive shaft. The drive assembly is configured to rotate the drive shaft. The drive pulley is in rotational communication with the drive assembly.

BRIEF DESCRIPTION OF THE DRAWINGS

The present invention can be more easily understood and further advantages and uses thereof will be more readily apparent, when considered in view of the detailed description and the following figures in which:

FIG. 4A is a partial assembled front view of the tension assembly of one embodiment;

FIG. 4B is a partial unassembled side perspective view of the tension assembly of FIG. 4A;

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Figure 1:
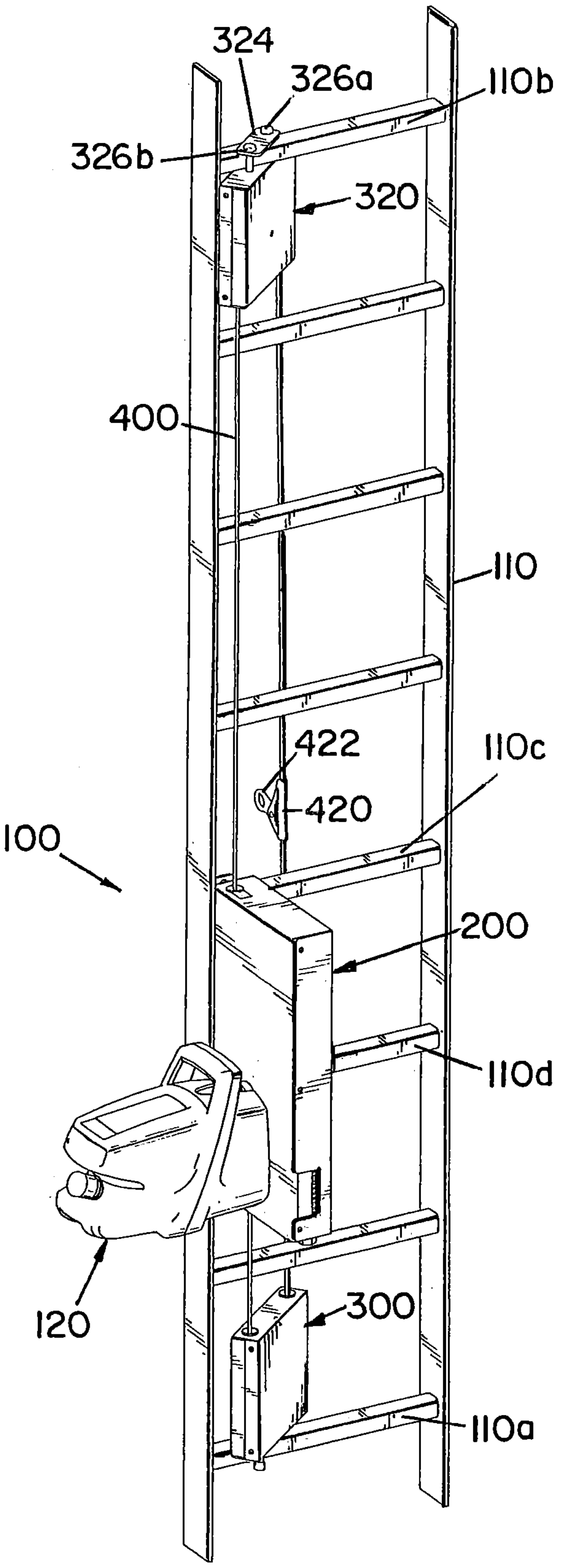
FIG. 1 is a side perspective view of a climb assist system of one embodiment of the present invention.

Embodiments of the present invention provide a climb assist system 100 with a tension assembly 200 that provides a significant amount of tensioning in a relatively small configuration to ensure proper operation of the climb assist system. In particular, embodiments employ a double pulley arrangement described in detail below. FIG. 1 illustrates a perspective view of the climb assist system 100 of one embodiment. The climb assist system 100 includes a drive assembly 120 that is coupled to a tension assembly 200. The drive assembly 120 is designed to move an endless looped member 400 such as, but not limited to, a cable, belt or the like. The endless looped member 400 is coupled between an upper pulley assembly 320 and a lower pulley assembly 300. In particular, each of the upper and lower pulley assemblies 300 and 320 includes a pulley 340 (shown in FIG. 7A through 7C) in which the endless looped member 400 is routed around. The upper pulley assembly 320 is coupled to an upper rung 110*b* of a ladder 110 that the climb assist system 100 is coupled to via connector that includes a connector plate 324 and fasteners 326*a* and 326*b* as discussed below in regards to FIGS. 7A through 7C. The lower pulley assembly 300 is coupled to lower rung 110*a* of the ladder 110 via similar connector system. Positioned between the lower pulley assembly 300 and the upper pulley assembly 320 is the tension assembly 200 and the drive assembly 120. The tension assembly 200 further includes similar connectors to couple the tension assembly 200 to rungs 110*c* and 110*d* of the ladder 110. The connectors of the tension assembly 200 are further described in regards to FIGS. 4A and 4B discussed below.

As illustrated in FIG. 1, the endless looped member 400 is routed through the tension assembly 200. As further described below in detail, the drive assembly 102 rotates a drive pulley 230 (illustrated in FIG. 4A) that is engaged to move the endless looped member 400. A connecting member 420 coupled to the endless looped member 400 is coupled to a safety harness that is donned by a worker via connector aperture 422. When the worker is required to climb or descend the ladder 110, the worker connects his or her safety harness to the connector aperture 422 of the connector member 420. The drive assembly 120 then provides lift to the worker by moving the endless looped member 400 as the worker climbs or descends the ladder 110. The lift provided to the worker by the climb assist system 100 helps prevent fatigue.

Figures 2A, 2B:
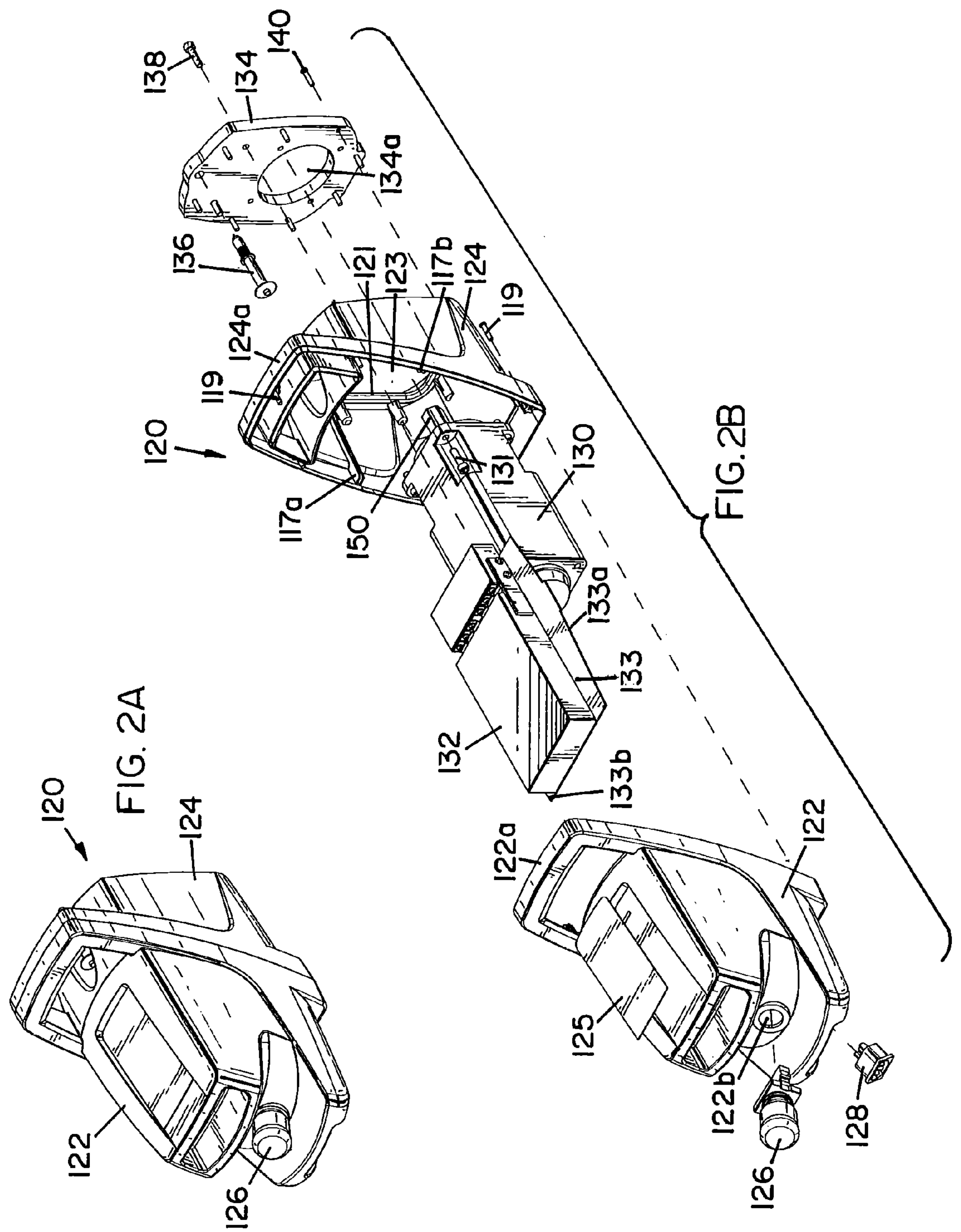
FIG. 2A is an assembled side perspective view of a drive assembly of one embodiment of the present invention.
FIG. 2B is an unassembled side perspective view of the drive assembly of FIG. 2A.

An embodiment of the drive assembly 120 is illustrated in FIGS. 2A and 2B. In particular, FIG. 2A illustrates drive assembly 120 in an assembled configuration while FIG. 2B illustrates the drive assembly 120 in a disassembled configuration. The drive assembly 120 of this embodiment includes a first housing portion 122 and a second housing portion 124. The first housing portion 122 includes a first handle portion 122*a* and the second housing portion 124 includes a second handle portion 124*a* that forms a handle when the first and second housing portions 122 and 124 are coupled together via fasteners 119. A motor 130 is received inside the first and second housing portions 122 and 124. The motor 130 turns a drive shaft 150 which is coupled to the drive pulley 230 of the tension assembly which is further discussed below. The second housing portion 124 includes a side 121 with an opening 123. A mount plate 134 is coupled to the side 121 of the second housing portion 124 to cover a portion of the opening 123 via fasteners 138 and 140. The mount plate includes a drive shaft passage 134*a*. When assembled, the drive shaft 150 of the motor 130 passes through the drive shaft opening 123 of the mount plate 134 while the motor 130 is mounted to the mount plate 134 via fasteners 131.

The drive assembly 120 further includes controller 132 that controls operation of the motor 130. In this embodiment, the controller 132 includes a housing that is coupled to a controller mounting plate 133 that has edges 133*a* and 133*b* that are received in tracks 117*a* and 117*b* in a cavity in the second housing portion 124 to hold the controller 132 in place. The first housing portion 122 would also have similar tracks to hold a portion of the edges 133*a* and 133*b* of the controller mounting plate 133 when the drive assembly 120 is assembled. Also shown is an emergency stop button 126 that is connected to the first housing portion 122. In particular, a portion of the emergency stop button 126 is received through a back passage 122*b* of the first housing portion 122. The emergency stop button 126 is in communication with controller 132. Upon the depression of the emergency button 126, the controller stops the motor 130. Also illustrated in FIG. 2B, is an electrical connector that is used to provide power to the controller 132 and motor 130 in an embodiment. The electrical connector is coupled to the first housing portion 122 and is in electrical communication with the controller 132 and the motor 130.

Figure 3:
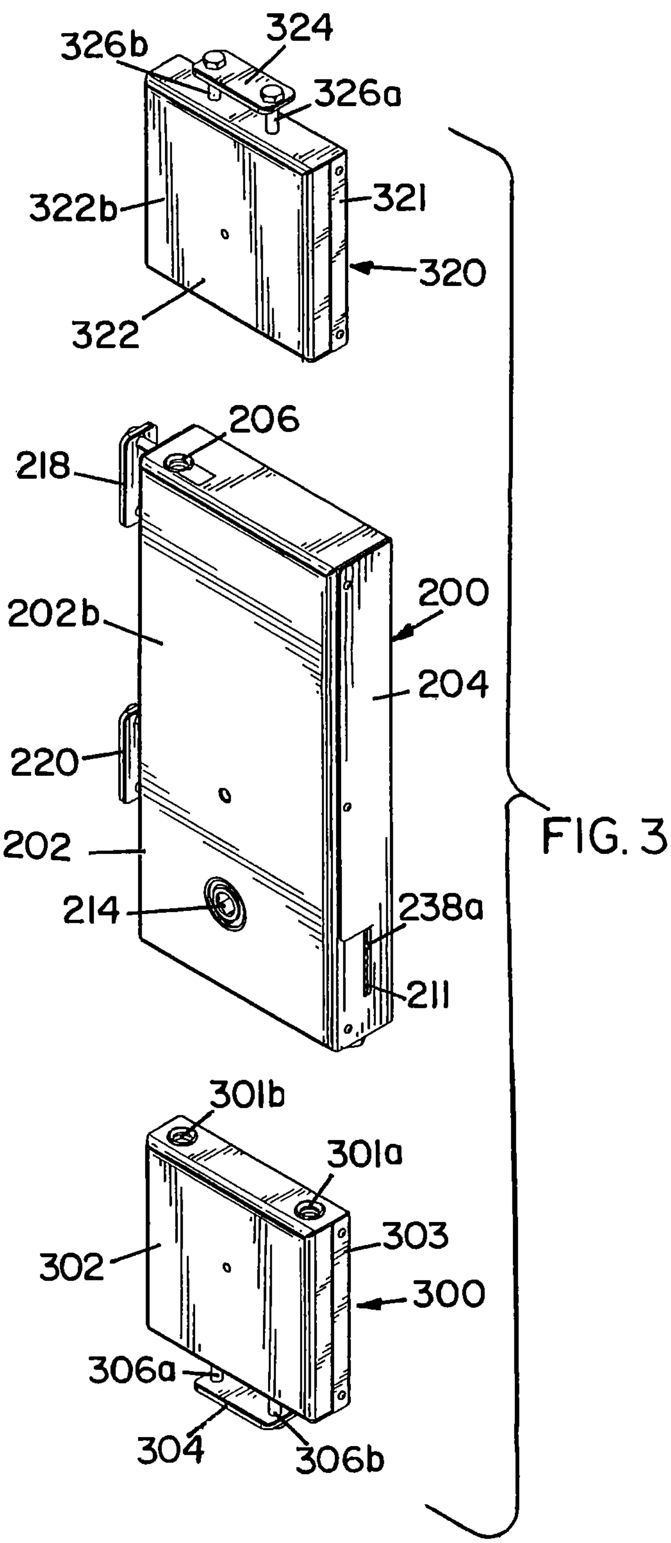
FIG. 3 is a front perspective view of a ladder climb assembly including a tension assembly, an upper pulley assembly and a lower pulley of one embodiment of the present invention.

FIG. 3 illustrates a kit portion of the climb assist system 100 that is coupled to a ladder. The kit portion includes the tension assembly 200, the upper pulley assembly 320 and the lower pulley assembly 300. The upper pulley assembly 320 includes a pulley housing 322 and an upper pulley cover 321. Extending from a top of the pulley housing 322 is a connector. The connector includes spaced fasteners 326*a* and 326*b* that extend from the housing 322 and a connection plate 324 coupled to the fasteners. The tension assembly 200 includes a housing 202 and a cover 204. A top portion of the housing 202 includes a cable passage 206. As illustrated, the housing portion 204 includes a drive shaft receiving passage 214. The kit portion also includes the lower pulley assembly 300 as discussed above. The lower pulley assembly 300 includes a housing 302 and a lower pulley cover 303. The housing 302 of the lower pulley assembly 300 includes a first and a second cable passage 301*a* and 301*b*. The upper pulley assembly 320 will have similar cable passages. The lower pulley assembly 300 also has a ladder connector that includes spaced fasteners 306*a* and 306*b* and a connection plate 304 that is coupled to the fasteners 306*a* and 306*b*. The upper pulley assembly 320, lower pulley assembly 300 and the tension assembly 200 are further described in detail below.

FIGS. 4A and 4B further illustrate the tension assembly 200. In particular, FIG. 4A illustrates a side view of the tension assembly housing 202 of the tension assembly 200 without a cover 204 and FIG. 4B is an unassembled side perspective view. The tension assembly housing 202 is shown having a top end wall 202*a*, an opposed bottom end wall 202*b*, a first side wall 202*c*, an opposed second side wall 202*d* and a back panel 202*e*. In this embodiment, connectors similar to the connectors that couple the upper and lower pulley assemblies 300 and 320 to the ladder 110 is used to couple the tension assembly 200 to the ladder 110. In particular, a first connector includes a connection plate 218 that is coupled a spaced distance from the second side wall 202*d* of the housing 202. As second connector includes a connection plate 220 that is coupled a spaced distance from the second side wall 202*d* of the housing 202. The first connector is further spaced a select distance from the second connector. Referring back to FIG. 1, the first connector is coupled to rung 110*c* of the ladder 110 and the second connector is coupled to rung 110*d* of the ladder 110. Referring back to FIG. 4B, the top end wall 202*a* of the housing 202 includes a first tension assembly cable passage 206 in which a grommet 207 is positioned. The first tension assembly cable passage 206 is positioned near the second side wall 202*d*. The bottom end wall 202*b* of the housing 202 includes a second tension assembly cable passage 208 that is generally aligned with the first tension assembly passages 206. A grommet 207 is also received in the second tension assembly cable passage 208. The grommets 207 help to reduce wear on the cable 400.

Figure 5:
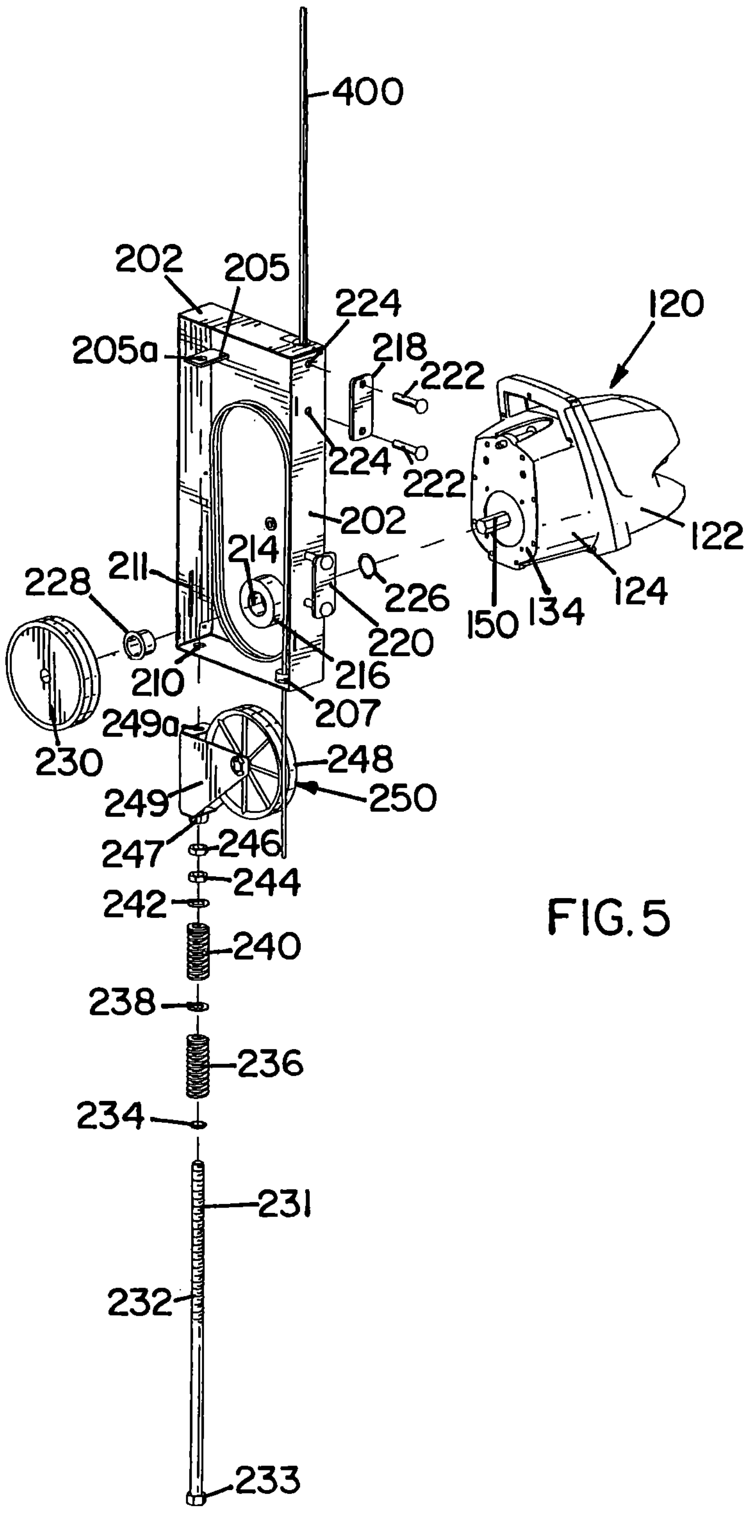
FIG. 5 is a partial assembled side perspective view of the tension assembly of FIG. 4A and the drive assembly of FIG. 2A.
Figure 6:
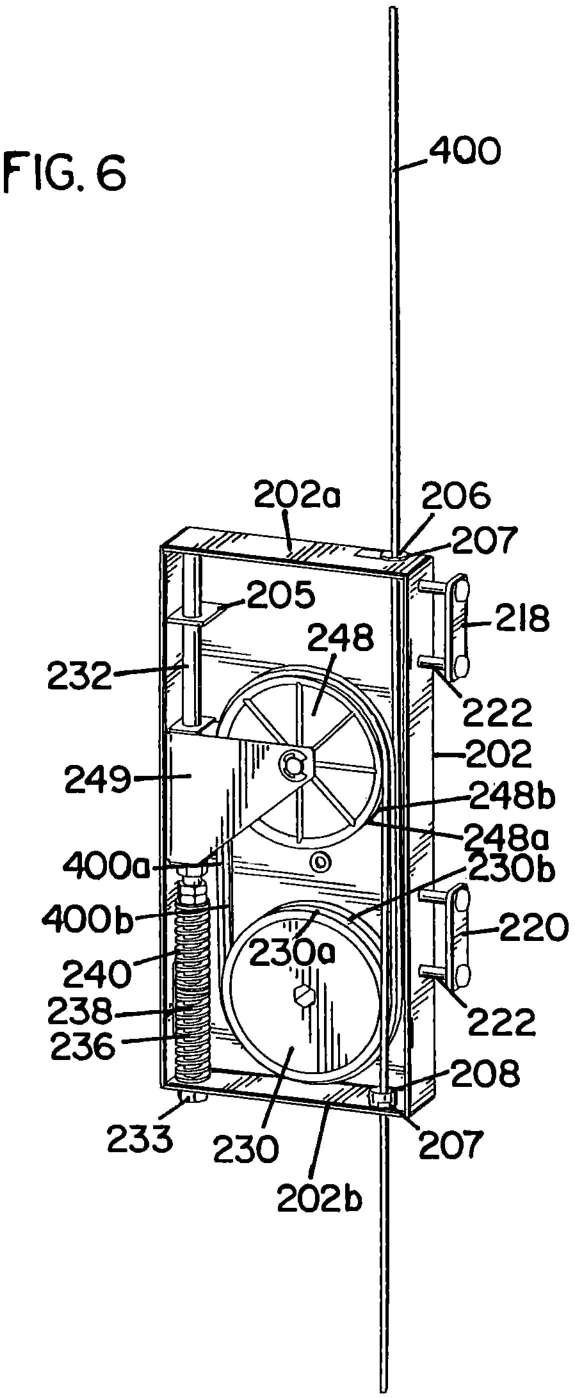
FIG. 6 is a partial assembled front perspective view of the tension assembly of FIG. 4A engaging an endless looped member.

As discussed above, the housing 202 includes a drive shaft receiving passage 214 that passes through the back panel 202*e*. A receiving bushing 216 is positioned around the drive shaft passage 214. A bearing 228 is received in the receiving bushing 216. The drive shaft 150 of motor 130 is then in turn received within the bearing 228. This is further illustrated in FIG. 5. A retaining clip 226 is used in part to retain the drive shaft 150 within the drive shaft receiving passage 214. The drive shaft 150 is positioned within a central receiving passage 230*c* of the drive pulley 230. The central receiving passage 230*c* is shaped to engage the shape of the drive shaft 150 so that rotation of the drive pulley 230 is locked with the rotation of the drive shaft 150. A tension rod 232 is received through a rod passage 210 of the bottom end wall 202*b* of the housing 202. The tension rod 232 has exterior threads 231. An end of the tension rod 232 is received in a rod guide aperture 205*a* in a rod guide 205 to hold the rod in place in the tension assembly 200. This is illustrated in FIG. 6. Referring back to FIG. 4B, received on the tension rod 232 is received a bearing 234, first and second biasing members 236 and 240, an indicator washer 238, washer 242, nuts 244 and 246 and a tension pulley assembly 250. The bearing 234 is received in rod passage 210 of the tension assembly housing 202. The indicator washer 238 is positioned between the first and second biasing members 236 and 240. The indicator washer 238 includes an indicator tab 238*a* that is slidably received in the indication window 211 of the first side wall housing 202*c* of the housing 202. The indicator tab 238*a* in the indication window 211 conveys a tension of the tension assembly 200. The tension pulley assembly 250 includes a tension pulley 248 (or tensioning sheave 248) and a tension pulley bracket 249. The tension pulley 248 is rotationally coupled to the tension pulley bracket 249. The tension pulley bracket 249 further includes a tension adjusting rod passage 249*a* that receives the tension rod 232. A threaded nut 247 is coupled to a bottom end of the tension pulley bracket 249. The threaded nut 247 is aligned with the tension adjusting rod passage 249*a* and is threadably engaged with the exterior threads 231 of the tension rod 232.

The tension pulley 248 includes first tension pulley channel 248*a* and a second tension pulley channel 248*b* and the drive pulley 230 (drive sheave 230) includes a first drive pulley channel 230*a* and a second drive pulley channel 230*b*. The endless looped member 400 (cable) is routed around the tension pulley 248 and the drive pulley 230. In particular, as illustrated in FIG. 5, the cable 400 is configured to have a first loop 400*a* and a second loop 400*b*. This double loop arrangement allows for more friction to provide lift. That is, a select amount of friction between the cable 400 and the drive pulley channels 230*a* and 230*b* of drive pulley 230 is needed to convey the motion of rotation of the drive pulley 230 to the cable 400. The double looped arrangement provides a significant amount of tensioning in a small envelope to provide the needed friction. As illustrated in FIG. 6, the first loop 400*a* is received in the first tensions pulley channel 248*a* of the tensions pulley 248 and the first drive pulley channel 230*a* of the drive pulley 230 and the second loop 400*b* is received in the second tension pulley channel 248*b* of the tensions pulley 248 and the second drive pulley channel 230*b* of the drive pulley 230. As best illustrated in FIG. 6, drive pulley 230 is offset from the tension pulley 248. This arrangement allows the cable 400 to pass between the first tension pulley channel 248*a* of the tension pulley 248 and the second tension assembly cable passage 208 in the bottom end wall 202*b* of the tension assembly housing 202 without interfering with the drive pulley 230. Likewise, it allows the cable 400 to pass between the second drive pulley channel 230*b* of the drive pulley 230 and the first tension assembly passage 206 in the top end wall 202*a* of the tension assembly housing 202 without interfering with the tension pulley 228.

The biasing members 236 and 240 exert a biasing force on the tension pulley assembly 250 and the tension adjustment rod 232 to help counter stretch in the cable and expansion in the system due to temperature variation that can affect the tension in the cable 400. This biasing force on the tension pulley 248 away from the drive pulley 230 applies tension in the cable 400. Once the climb assist system 100 is mounted on the ladder 110, the amount of tension in the cable can be adjusted by rotating the tension adjustment rod 232. Rotation of the tension adjustment rod 232 is accomplished by turning a manipulation head 233 (manipulation end) of the rod 232 with a tool such as a wrench or the like. As discussed above, the indicator tab 238*a* of the indicator washer 238 (positioned between the biasing members 236 and 240) in the indicator window 211 of the tension assembly housing 202 provides an indication of the tension on the cable 400. Hence, if the cable 400 stretches during use, as indicated by the position of the indicator tab 238*a* in the window 211, the tension adjustment rod 232 can be rotated to adjust the tension.

Figure 7C:
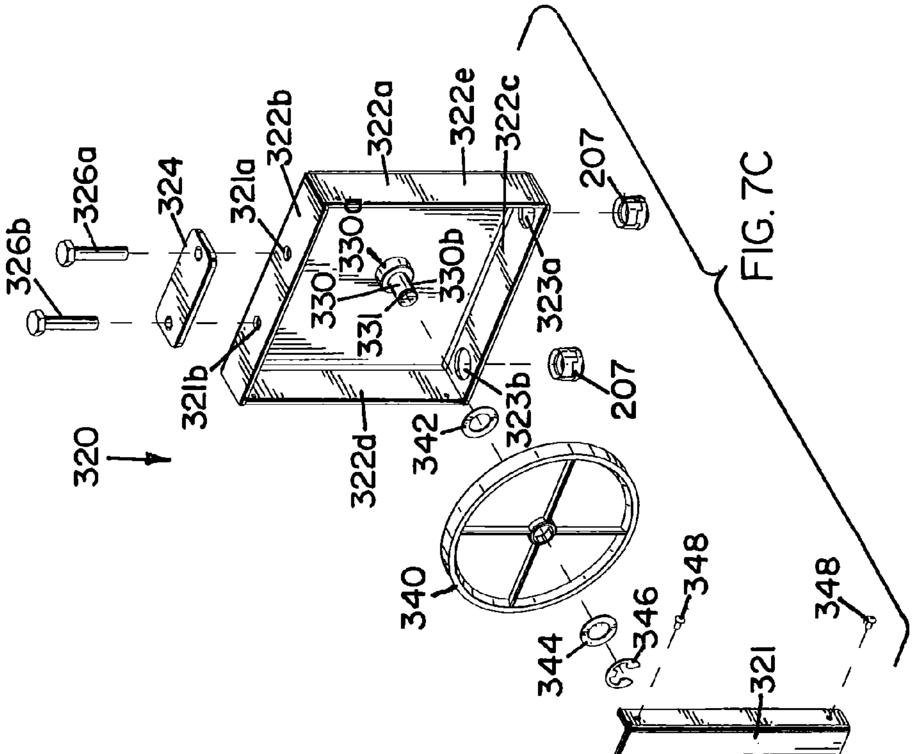
FIG. 7C is an unassembled upper pulley assembly of the climb assist system of FIG. 1.
Figure 7B:
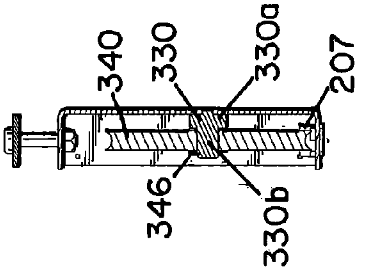
FIG. 7B is a cross sectional side view along line 7B-7B of the upper assembly of FIG. 7A.
Figure 7A:
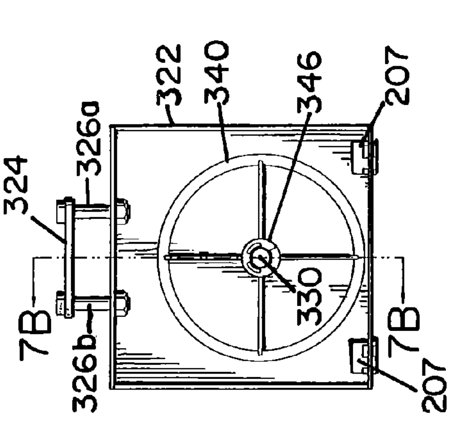
FIG. 7A is a partial front view of the upper pulley assembly of the climb assist system of FIG. 1.

An illustration of the upper pulley assembly 320 is illustrated in FIGS. 7A through 7C. The lower pulley assembly 300 in an embodiment is the same as the upper pulley assembly 320. The upper pulley assembly 320 includes the housing 322 and the cover 321. The housing 322 includes a back panel 322*a*, a first end wall 322*b*, a second end wall 322*c*, a first side wall 322*d* and a second side wall 322*e*. Proximate a central location of the back panel 322*a* of the housing 322, a pulley post 330 (sheave post) is mounted. The pulley post 330 includes a first spacing portion 330*a* and a second holding portion 330*b*. A pulley 340 (sheave) is rotationally mounted on the second holding portion 330*b* of the pulley post 330. The first spacing portion 330*a* spaces the pulley 340 from the back plate 322*a* of the housing 322. As illustrated in FIG. 7C, washers 344 and 342 are also received on the second holding portion 330*b* of the pulley post 330 on either side of the pulley 340. A C-clip 346 is received in C-clip groove 331 in the second holding portion 330*b* of the pulley post 330 to retain the pulley 340 on the post 330. Also illustrated in FIG. 7C is a pair of spaced bores 321*a* and 321*b* in the first end wall 322*b* in which fasteners 326*a* and 326*b* are connected to form a connector with the connection plate 324. As illustrated, the fasteners 326*a* and 326*b* pass through bores in the connection plate 324. The connector including the fasteners 326*a* and 326*b* and the connection plate 324, as discussed above, couple the pulley assembly 320 to a rung of a ladder 110. As best illustrated in FIG. 7C, the second end wall 322*c* of the housing 322 includes two spaced cable passages 323*a* and 323*b* in which the cable 400 is routed. Grommets 207 are inserted in the spaced cable passages to lessen the wear on the cable 400. The cover 321 is mounted on the housing 322 via fasteners 348. Although the above description describes a climb assist system 100 that includes a cable 400, any type of endless looped member 400 can be used, such as, but not limited to, rope, belt, webbing and the like.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A climb assist system comprising:

an upper pulley assembly configured and arranged to be coupled to an upper rung of a ladder, the upper pulley assembly further configured to route an endless looped member about different sides of the ladder;

a lower pulley assembly configured and arranged to be coupled to a lower rung of the ladder, the lower pulley assembly further configured to route the endless looped member about different sides of the ladder to the upper pulley assembly;

a tension assembly coupled to the ladder between the upper pulley assembly and the lower pulley assembly, the tension assembly including, a drive pulley having a first drive pulley channel and a second drive pulley channel;

a tension pulley having a first tension pulley channel and a second tension pulley channel, the second tension pulley channel being aligned with the first drive pulley channel, the first drive pulley channel and the second drive pulley channel of the drive pulley and the first tension pulley channel and the second tension pulley channel of the tension pulley configured and arranged to engage and route the endless looped member; and a tension adjustment system coupled to adjust the distance between the drive pulley and the tension pulley;

a drive assembly having a drive shaft, the drive assembly configured to rotate the drive shaft, the drive pulley in rotational communication with the drive assembly;

a housing, the drive pulley and the tension assembly received in the housing, the housing having a top end wall and an opposed bottom end wall, the top end wall having a first cable passage and the bottom end wall having a second cable passage, the endless looped member passing through the first cable passage and the second cable passage;

a threaded tension adjustment rod extending through a rod receiving aperture in the housing;

a tension pulley bracket, the tension pulley rotationally coupled to the tension pulley bracket, the tension pulley bracket threadably coupled to the threaded tension adjustment rod wherein turning the threaded tension adjustment rod adjusts the distance between the drive pulley and the tension pulley to adjust tension in the endless looped member; and at least one biasing member configured and arranged to provide a biasing force on the tension pulley to bias the tension pulley away from the drive pulley.

2. The climb assist system of claim 1, further comprising:

the at least one biasing member configured and arranged to provide a biasing force between the threaded tension adjustment rod and tension pulley bracket to help maintain a select tension in the endless looped member.

3. The climb assist system of claim 2, further comprising:

a portion of the threaded tension adjustment rod extending outside of the housing to allow rotation of the threaded tension adjustment rod.

4. The climb assist system of claim 2, wherein the at least one biasing member includes a first biasing member and a second biasing member.

5. The climb assist system of claim 2, further comprising:

the housing including an indication window;

an indicator washer having an indicator tab, the indicator washer in communication with the at least one biasing member, the indicator tab viewable in the indication window of the housing.

6. The climb assist system of claim 1, further comprising:

an indicator in communication with the tension adjustment system to indicate the tension in the endless looped member.

7. The climb assist system of claim 1, further comprising:

at least one connector for each of the upper pulley assembly, the lower pulley assembly and the tension assembly configured and arranged to couple each of the upper pulley assembly, the lower pulley assembly and the tension assembly to an associated rung of a ladder.

8. A drive and tensioning assembly, the assembly comprising:

a housing having a top end wall and an opposed bottom end wall, the top end wall having a first cable passage and the bottom end wall having a second cable passage;

a drive pulley received in the housing having a first drive pulley channel and a second drive pulley channel;

a drive assembly including a drive shaft, the drive assembly configured to rotate the drive shaft, the drive shaft extending through a housing aperture, the drive pulley is in rotational communication with the drive shaft of the drive assembly;

a tension pulley received in the housing having a first tension pulley channel and a second tension pulley channel, the second tension pulley channel being aligned with the first drive pulley channel, the first drive pulley channel and the second drive pulley channel of the drive pulley and the first tension pulley channel and the second tension pulley channel of the tension pulley configured and arranged to engage and route an endless looped member into and out of the first cable passage and second cable passage of the housing;

a tension adjustment system coupled to adjust a distance between the drive pulley and the tension pulley in the housing;

a threaded tension adjustment rod extending through a rod receiving aperture in the housing;

a tension pulley bracket, the tension pulley rotationally coupled to the tension pulley bracket, the tension pulley bracket threadably coupled to the threaded tension adjustment rod, wherein turning the threaded tension adjustment rod adjusts the distance between the drive pulley and the tension pulley to adjust tension in the endless looped member; and at least one biasing member configured and arranged to provide a biasing force on the tension pulley bracket away from the drive pulley.

9. The assembly of claim 8, further comprising:

the at least one biasing member configured and arranged to provide a biasing force on the threaded tension adjustment rod to help maintain a select tension in the endless looped member.

10. The assembly of claim 9, further comprising:

the housing including an indication window; and an indicator washer having an indicator tab, the indicator washer engaging the at least one biasing member, the indicator tab of the indicator washer received in the indication window of the housing.

11. The assembly of claim 8, further comprising:

a portion of the threaded tension adjustment rod extending outside of the housing, the portion including a manipulation end configured to allow the rotation of the threaded tension adjustment rod with a tool.

12. A tensioning assembly comprising:

a drive pulley having a first drive pulley channel and a second drive pulley channel;

a tension pulley having a first tension pulley channel and a second tension pulley channel, the second tension pulley channel being aligned with the first drive pulley channel, the first drive pulley channel and the second drive pulley channel of the drive pulley and the first tension pulley channel and the second tension pulley channel of the tension pulley configured and arranged to engage and route an endless looped member;

a tension adjustment system coupled to adjust a distance between the drive pulley and the tension pulley to adjust a tension in the endless looped member in relation to the drive pulley;

a housing, the drive pulley and the tension assembly received in the housing, the housing having a top end wall and an opposed bottom end wall, the top end wall having a first cable passage and the bottom end wall having a second cable passage, the endless looped member passing through the first cable passage and the second cable passage;

a threaded tension adjustment rod extending through a rod receiving aperture in the housing;

a tension pulley bracket, the tension pulley rotationally coupled to the tension pulley bracket, the tension pulley bracket threadably coupled to the threaded tension adjustment rod, wherein turning the threaded tension adjustment rod adjusts the distance between the drive pulley and the tension pulley to adjust tension in the endless looped member; and at least one biasing member configured and arranged to provide a biasing force on the tension pulley bracket away from the drive pulley.

13. The tensioning assembly of claim 12, further comprising:

the at least one biasing member configured and arranged to provide the biasing force on the tension pulley bracket to help maintain a select tension in the endless looped member.

14. The tensioning assembly of claim 13, further comprising:

the housing including an indication window; and an indicator washer having an indicator tab, the indicator washer engaging the at least one biasing member and the indicator tab received in the indication window of the housing.

15. The tensioning assembly of claim 12, further comprising:

a portion of the threaded tension adjustment rod extending outside of the housing, the portion including a manipulation end configured to allow the rotation of the threaded tension adjustment rod with a tool.

* * * * *